(12) United States Patent
Fu

(10) Patent No.: US 10,834,469 B2
(45) Date of Patent: Nov. 10, 2020

(54) LOGICAL CHANNEL NUMBER PARSING METHOD AND DEVICE

(71) Applicant: SHENZHEN TCL DIGITAL TECHNOLOGY LTD., Guangdong (CN)

(72) Inventor: Yong Fu, Guangdong (CN)

(73) Assignee: SHENZHEN TCL DIGITAL TECHNOLOGY LTD., Shenzhen (CN)

( * ) Notice: Subject to any disclaimer, the term of this patent is extended or adjusted under 35 U.S.C. 154(b) by 151 days.

(21) Appl. No.: 16/309,965

(22) PCT Filed: Jun. 7, 2016

(86) PCT No.: PCT/CN2016/085025
§ 371 (c)(1),
(2) Date: Dec. 14, 2018

(87) PCT Pub. No.: WO2017/177525
PCT Pub. Date: Oct. 19, 2017

(65) Prior Publication Data
US 2019/0174199 A1  Jun. 6, 2019

(30) Foreign Application Priority Data

Apr. 14, 2016 (CN) .......................... 2016 1 0232180

(51) Int. Cl.
*H04N 21/482* (2011.01)
*H04N 21/435* (2011.01)
(Continued)

(52) U.S. Cl.
CPC ........... *H04N 21/4823* (2013.01); *H04N 5/50* (2013.01); *H04N 21/435* (2013.01);
(Continued)

(58) Field of Classification Search
CPC ............. H04N 21/4823; H04N 21/482; H04N 21/435; H04N 21/438; H04N 21/4345; H04N 21/4355; H04N 21/4383
See application file for complete search history.

(56) References Cited

U.S. PATENT DOCUMENTS

2011/0248193 A1* 10/2011 Goldstein .............. A61B 46/00
250/519.1

FOREIGN PATENT DOCUMENTS

| CN | 101820516 A | 9/2010 |
| CN | 102123323 A | 7/2011 |

(Continued)

OTHER PUBLICATIONS

Digital Video Broadcasting (DVB) ; Specification for Service Information (SI) in DVB systems, European Broadcasting Union, Jan. 31, 2003, ETSI EN 300 468, V1.5.1.
(Continued)

*Primary Examiner* — Yassin Alata

(57) ABSTRACT

Disclosed are a logical channel number parsing method and a logical channel number parsing device. The method includes: acquiring an operator which provides program signal, and searching channels in sequence according to preset frequency points; acquiring channel information of a current frequency point, and extracting logical channel number data from the channel information, when searching channels according to each of the frequency points; and parsing the logical channel number data according to a prestored logical channel number configuration table corresponding to the operator, to obtain each of attribute parameters comprised in the logical channel number data. The present disclosure simplifies the parsing operation of the logical channel number.

12 Claims, 2 Drawing Sheets

```
acquiring an operator which provides program signal, and searching channels in     ── S10
sequence according to preset frequency points
                                    │
                                    ▼
acquiring channel information of a current frequency point, and extracting         ── S20
logical channel number data from the channel information, when searching
channels according to each of the frequency points
                                    │
                                    ▼
parsing the logical channel number data according to a prestored logical channel   ── S30
number configuration table corresponding to the operator, to obtain each of
attribute parameters comprised in the logical channel number data
```

(51) Int. Cl.
H04N 21/438 (2011.01)
H04N 5/50 (2006.01)
H04N 21/434 (2011.01)

(52) U.S. Cl.
CPC ....... H04N 21/438 (2013.01); H04N 21/4345 (2013.01); H04N 21/4355 (2013.01); H04N 21/4383 (2013.01); H04N 21/482 (2013.01)

(56) References Cited

FOREIGN PATENT DOCUMENTS

| | | | |
|---|---|---|---|
| CN | 102695085 A | 9/2012 | |
| CN | 102780922 A | 11/2012 | |
| CN | 104053067 A | 9/2014 | |
| JP | 2011135504 A | 7/2011 | |
| JP | 5387394 B2 | 1/2014 | |
| WO | 9935822 A1 | 7/1999 | |
| WO | 2011/161582 A1 | 12/2011 | |
| WO | WO-2011161582 A1 * | 12/2011 | ....... H04N 21/42202 |

OTHER PUBLICATIONS

Search Report of counterpart European Patent Application No. 16898340.1 dated Dec. 3, 2019.
International Search Report of PCT Patent Application No. PCT/CN2016/085025 dated Jan. 18, 2017.

* cited by examiner

LOGICAL CHANNEL NUMBER PARSING METHOD AND DEVICE

FIELD

The present disclosure relates to the field of communication technology, and more particularly relates to a logical channel number parsing method and a logical channel number parsing device.

BACKGROUND

In different countries or different regions, programs are commonly provided to digital televisions and digital television set-top boxes by different operators. Each operator has its own logical channel number regulation, different operators have different logical channel number regulations. Generally, when searching programs, the terminal needs to parse the logical channel number based on a parsing algorithm matched with the logical channel number regulation of the corresponding operator. Therefore, for different operators, different parsing algorithms are adopted, which makes the logical channel number parsing complicated.

SUMMARY

It is one main object of the present disclosure to provide a logical channel number parsing method and a logical channel number parsing device, aiming to solve the technical problem in the prior art that the logical channel number parsing is complicated.

In order to realize the above aim, the present disclosure provides a logical channel number parsing method, the logical channel number parsing method includes:

acquiring an operator which provides program signal, and searching channels in sequence according to preset frequency points;

acquiring channel information of a current frequency point, and extracting logical channel number data from the channel information, when searching channels according to each of the frequency points; and parsing the logical channel number data according to a prestored logical channel number configuration table corresponding to the operator, to obtain each of attribute parameters included in the logical channel number data;

the operation of parsing the logical channel number data according to a logical channel number configuration table corresponding to the operator, to obtain each of attribute parameters included in the logical channel number data, including:

acquiring first bit offset and total bits corresponding to each of the attribute parameters included in the logical channel number configuration table corresponding to the operator; and parsing the logical channel number data according to the acquired first bit offset and the total bits corresponding to each of the attribute parameters, and determining each of the attribute parameters in the logical channel number data; based on different operators, the first bit offset and the total bits, corresponding to each of the attribute parameters in the logical channel number, are different.

Preferably, the attribute parameters include service ID and priority, after the operation of obtaining each of attribute parameters included in the logical channel number data, the method further includes:

updating the attribute parameters associated with a stored service ID with the obtained attribute parameters, when the stored service ID is consistent with the service ID in the obtained attribute parameters, and the priority associated with the stored service ID is lower than the priority in the obtained attribute parameters; each of the attribute parameters obtained is stored in association, when the frequency point of a current frequency-locked operation is the frequency point of the first frequency-locked operation; and storing the obtained attribute parameters, when the stored service ID is different from the service ID in the obtained attribute parameters.

In addition, in order to realize the above aim, the present disclosure further provides a logical channel number parsing method, the logical channel number parsing method including:

acquiring an operator which provides program signal, and searching channels in sequence according to preset frequency points;

acquiring channel information of a current frequency point, and extracting logical channel number data from the channel information, when searching channels according to each of the frequency points; and parsing the logical channel number data according to a prestored logical channel number configuration table corresponding to the operator, to obtain each of attribute parameters included in the logical channel number data.

Preferably, prior to the operation of acquiring an operator which provides program signal, the method further includes:

customizing corresponding logical channel number configuration tables for different operators, according to different logical channel number regulations of each operator in each country or region, and storing the logical channel number configuration tables in a database.

Preferably, the operation of parsing the logical channel number data according to a prestored logical channel number configuration table corresponding to the operator, to obtain each of attribute parameters included in the logical channel number data, includes:

inquiring whether there is the logical channel number configuration table in the database matching to the operator, when the logical channel number data is extracted; and parsing the logical channel number data, according to the logical channel number configuration table matching to the operator, to obtain each of the attribute parameters included in the logical channel number data, when there is the logical channel number configuration table in the database matching to the operator.

Preferably, the operation of parsing the logical channel number data, according to the logical channel number configuration table corresponding to the operator, to obtain each of the attribute parameters included in the logical channel number data, includes:

acquiring first bit offset and total bits corresponding to each of the attribute parameters included in the logical channel number configuration table corresponding to the operator; and parsing the logical channel number data according to the acquired first bit offset and the total bits corresponding to each of the attribute parameters, and determining each of the attribute parameters in the logical channel number data; based on different operators, the first bit offset and the total bits, corresponding to each of the attribute parameters in the logical channel number, are different.

Preferably, the attribute parameters include service ID and priority, after the operation of obtaining each of attribute parameters included in the logical channel number data, the method further includes:

updating the attribute parameters associated with a stored service ID with the obtained attribute parameters, when the stored service ID is consistent with the service ID in the obtained attribute parameters, and the priority associated with the stored service ID is lower than the priority in the obtained attribute parameters; each of the attribute parameters obtained is stored in association, when the frequency point of a current frequency-locked operation is the frequency point of the first frequency-locked operation; and storing the obtained attribute parameters, when the stored service ID is different from the service ID in the obtained attribute parameters.

In addition, in order to realize the above aim, the present disclosure further provides a logical channel number parsing device, the logical channel number parsing device includes:

a searching module, configured to acquire an operator which provides program signal, and searching channels in sequence according to preset frequency points;

an acquiring module, configured to acquire channel information of a current frequency point, and extracting logical channel number data from the channel information, when searching channels according to each of the frequency points; and a parsing module, configured to parse the logical channel number data according to a prestored logical channel number configuration table corresponding to the operator, to obtain each of attribute parameters included in the logical channel number data.

Preferably, the logical channel number parsing device further includes:

a configuration module, configured to customize corresponding logical channel number configuration tables for different operators, according to different logical channel number regulations of each operator in each country or region, and storing the logical channel number configuration tables in a database.

Preferably, the parsing module includes:

an inquiring unit, configured to inquire whether there is the logical channel number configuration table in the database matching to the operator, when the logical channel number data is extracted; and a parsing unit, configured to parse the logical channel number data, according to the logical channel number configuration table matching to the operator, to obtain each of the attribute parameters included in the logical channel number data, when there is the logical channel number configuration table in the database matching to the operator.

Preferably, the parsing unit includes:

an acquiring sub-unit, configured to acquire first bit offset and total bits corresponding to each of the attribute parameters included in the logical channel number configuration table corresponding to the operator;

a parsing sub-unit, configured to parse the logical channel number data according to the acquired first bit offset and the total bits corresponding to each of the attribute parameters, and determining each of the attribute parameters in the logical channel number data; based on different operators, the first bit offset and the total bits, corresponding to each of the attribute parameters in the logical channel number, are different.

Preferably, the attribute parameters include service ID and priority, the logical channel number parsing device further includes:

a storage module, configured to update the attribute parameters associated with a stored service ID with the obtained attribute parameters, when the stored service ID is consistent with the service ID in the obtained attribute parameters, and the priority associated with the stored service ID is lower than the priority in the obtained attribute parameters; each of the attribute parameters obtained is stored in association, when the frequency point of a current frequency-locked operation is the frequency point of the first frequency-locked operation; and store the obtained attribute parameters, when the stored service ID is different from the service ID in the obtained attribute parameters.

Preferably, the attribute parameters include service ID and priority, the logical channel number parsing device further includes:

a storage module, configured to update the attribute parameters associated with a stored service ID with the obtained attribute parameters, when the stored service ID is consistent with the service ID in the obtained attribute parameters, and the priority associated with the stored service ID is lower than the priority in the obtained attribute parameters; each of the attribute parameters obtained is stored in association, when the frequency point of a current frequency-locked operation is the frequency point of the first frequency-locked operation; and store the obtained attribute parameters, when the stored service ID is different from the service ID in the obtained attribute parameters.

In the logical channel number parsing method and the logical channel number parsing device provided in the present disclosure, after acquiring the operator which provides the program signal, the logical channel number could be parsed based on the prestored logical channel number configuration table corresponding to the operator. There is no need to adopt different parsing algorithms for matching different operators, thus simplifying the parsing operation of the logical channel number.

The realizing of the aim, functional characteristics and advantages of the present disclosure are further described in detail with reference to the accompanying drawings and the embodiments.

DETAILED DESCRIPTION OF THE EMBODIMENTS

It will be appreciated that the specific embodiments described herein are merely illustrative of the present disclosure and are not intended to limit the present disclosure.

Figure 1:
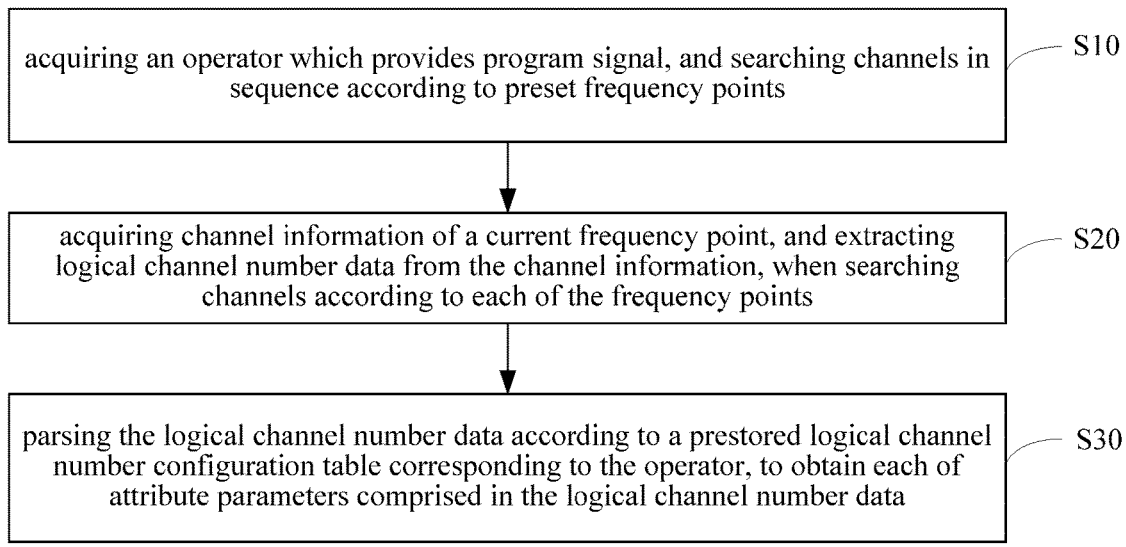
FIG. 1 is a flowchart diagram of a first embodiment of a logical channel number parsing method according to this disclosure.

The present disclosure provides a logical channel number parsing method. Referring to FIG. 1, FIG. 1 is a flowchart diagram of a first embodiment of a logical channel number parsing method according to this disclosure.

In this embodiment, the logical channel number parsing method includes:

step S10, acquiring an operator which provides program signal, and searching channels in sequence according to preset frequency points;

It's well known that, in different countries and regions, operators that provide program signal contents for terminals, such as digital televisions, digital television set-top boxes, are different, some regions even have a plurality of operators. The program signal contents provided by different operators are different. The difference in the program signal contents provided by operators means that channels are different and/or attribute parameters are different, for example, the channels corresponding to a same frequency point are different. In this embodiment, a logical channel number parsing device is provided inside the terminal, such as a digital television or a digital television set-top box, or a logical channel number parsing device is externally connected to the terminal, such as a digital television or a digital television set-top box. The terminal includes, but is not limited to, the digital television, the digital television set-top box, and so on.

When the terminal searches programs, the logical channel number parsing device first acquires the operator providing the program signal. Specifically, the operator providing the program signal for the terminal could be determined according to the operator selected by the user; or the operator providing the program signal for the terminal could be automatically acquired according to the country or the region corresponding to the current program searching. Or the operator is sent to the logical channel number parsing device after the operator is determined by the terminal. Those skilled in the art should understand that, the way to acquire the information of the operator is not to be limited herein. For example, first the user selects a corresponding country, after the country selected by the user is received, an operator list corresponding to the country is acquired, the operator list including each of operators in the selected country. Based on the operator list, the user could select a corresponding operator, and the logical channel number parsing device acquires the operator selected by the user.

step S20, acquiring channel information of a current frequency point, and extracting logical channel number data from the channel information, when searching channels according to each of the frequency points;

step S30, parsing the logical channel number data according to a prestored logical channel number configuration table corresponding to the operator, to obtain each of attribute parameters included in the logical channel number data.

when the user searches programs, for example, clicks a program search control preset in the terminal, it is regarded that the terminal receives a program searching instruction. After the program searching instruction is received, the terminal searches channels. Specifically, the terminal could search channels, according to each frequency point in the corresponding frequency band, to search programs. For example, to lock one frequency point in the frequency band, programs are searched based on the frequency point which is currently locked, according to corresponding searching parameters set by the user.

When the program signal is searched, channel information corresponding to the current frequency point is obtained. The channel information includes logical channel number data, the logical channel number data includes each of attribute parameters, such as service ID, logical channel number, visible, only changed by numerical, priority, and so on. Since each operator possesses its own logical channel number regulation, for different operators, corresponding logical channel number regulations are different. For example, the attribute parameters included in the logical channel number data are different, and first bit offset and total bits corresponding to each of the attribute parameter are different. Specifically, when the program signal is searched, it's to receive the channel information corresponding to the current frequency point, such as Network Information Table (NIT), Service Description Table (SDT), which is sent by a server. Then, it's to extract the logical channel number data corresponding to the current frequency point from the received NIT table and SDT table. It should be noted that, because the logical channel number data is generally included in the NIT table and the SDT table, it is needed to receive the NIT table and the SDT table of the locked frequency point.

Further, in this embodiment, before step S10, the method further includes:

step a, customizing corresponding logical channel number configuration tables for different operators, according to different logical channel number regulations of each operator in each country or region, and storing the logical channel number configuration tables in a database.

In this embodiment, the logical channel number configuration table corresponding to each of the operators is prestored. According to different logical channel number regulations corresponding to each operator in each country or region, the corresponding logical channel number configuration tables are customized for different operators, and the logical channel number configuration tables corresponding to different operators are stored in a database. The logical channel number configuration table corresponding to each operator includes each of the attribute parameters in the logical channel number data, the first bit offset and the total bits corresponding to each of the attribute parameters, the logical channel number data total bits, and so on. For example, the logical channel number configuration table is shown in Table 1:

TABLE 1

| logical channel number configuration table | | |
|---|---|---|
| service ID | service ID first bit offset | **** |
| | service ID total bits | **** |
| logical channelnumber | logical channel number first bit offset | **** |
| | logical channel number total bits | **** |
| visible | visible first bit offset | **** |
| | visible total bits | **** |
| only changed by numerical | only changed by numerical bit offset | **** |
| | only changed by numerical total bits | **** |
| priority | priority first bit offset | **** |
| | priority total bits | **** |
| logical channel number data total bits | | **** |

When the logical channel number data corresponding to the current frequency point is extracted, the logical channel number data corresponding to the current frequency point is parsed, according to the prestored logical channel number configuration table corresponding to the operator providing the program signal currently, and each of the attribute parameters included in the logical channel number data is obtained.

In the technical solution according to this embodiment, after acquiring the operator providing the program signal, the logical channel number data could be parsed based on the prestored logical channel number configuration table corresponding to the operator. There is no need to adopt different parsing algorithms for matching different operators, thus simplifying the parsing operation of the logical channel number.

Figure 2:
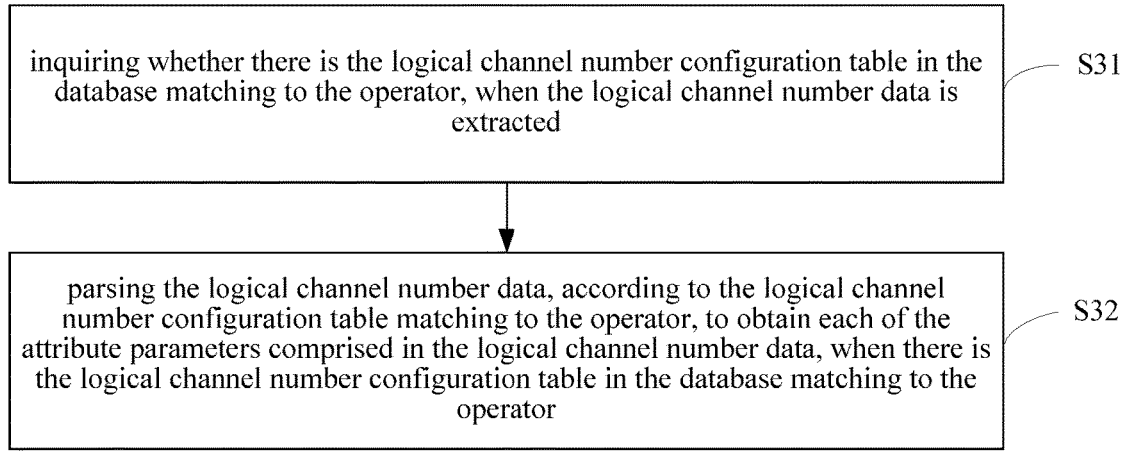
FIG. 2 is a detailed flowchart diagram of the step of obtaining each of attribute parameters included in the logical channel number data in a second embodiment of a logical channel number parsing method according to this disclosure.

Further, as shown in FIG. 2, a second embodiment of the logical channel number parsing method according to the present disclosure is provided based on the first embodiment. In this embodiment, the step S30 includes:

step S31, inquiring whether there is the logical channel number configuration table in the database matching to the operator, when the logical channel number data is extracted;

step S32, parsing the logical channel number data, according to the logical channel number configuration table matching to the operator, to obtain each of the attribute parameters included in the logical channel number data, when there is the logical channel number configuration table in the database matching to the operator.

In this embodiment, when the logical channel number data corresponding to the current frequency point is obtained, it's first to inquire whether there is the logical channel number configuration table matching to the currently acquired operator, in the prestored logical channel number configuration tables matching to each operator. Those skilled in the art could understand that, whether there is the logical channel number configuration table matching to the currently acquired operator could also be inquired after the operator is acquired. When there is not the logical channel number configuration table matching to the currently acquired operator, it's unable to parse the logical channel number data according to the configuration table, so as to obtain each of the attribute parameters included in the logical channel number data. In this case, by sending request via the network, the logical channel number configuration table or the logical channel number regulation of the operator could be downloaded from a cloud server of the operator or the television manufacturer, for parsing the logical channel number. When there is the logical channel number configuration table matching to the operator, the logical channel number data corresponding to the current frequency point is parsed according to the inquired logical channel number configuration table matching to the currently acquired operator, and each of the attribute parameters included in the logical channel number data is obtained. Specifically, step S32 includes:

step b, acquiring first bit offset and total bits corresponding to each of the attribute parameters included in the logical channel number configuration table corresponding to the operator first bit offset;

step c, parsing the logical channel number data according to the acquired first bit offset and the total bits corresponding to each of the attribute parameters, and determining each of the attribute parameters in the logical channel number data; based on different operators, the first bit offset and the total bits, corresponding to each of the attribute parameters in the logical channel number, are different first bit offset first bit offset.

For different operators, the first bit offset and the total bits of each attribute parameter in the logical channel number are different. In this embodiment, the first bit offset and the total bits corresponding to each attribute parameter in the logical channel number configuration table corresponding to the operator are obtained, when the logical channel number configuration table corresponding to the currently acquired operator is queried. For example, it's to obtain service ID first bit offset and service ID total bits corresponding to the service ID, logical channel number first bit offset and logical channel number total bits corresponding to the logical channel number, visible first bit offset and visible total bits corresponding to the visible, only changed by numerical first bit offset and only changed by numerical total bits corresponding to the only changed by numerical, priority first bit offset and priority total bits corresponding to the priority, and so on. Then, it's to parse the logical channel number data corresponding to the current frequency point, according to the obtained first bit offset and total bits corresponding to each of the attribute parameters, and determine each of the attribute parameters in the logical channel number data corresponding to the current frequency point. For example, if the obtained logical channel number first bit offset corresponding to the logical channel number is "**" bits, and the logical channel number total bits is 4 bits, the logical channel number is the attribute parameter, which corresponds to the 4 bits starting from the "**"th bit in the logical channel number data corresponding to the current frequency point.

Further, in this embodiment, after step S30, the method further includes:

step d, updating the attribute parameters associated with a stored service ID with the obtained attribute parameters, when the stored service ID is consistent with the service ID in the obtained attribute parameters, and the priority associated with the stored service ID is lower than the priority in the obtained attribute parameters; each of the attribute parameters obtained is stored in association, when the frequency point of a current frequency-locked operation is the frequency point of the first frequency-locked operation;

step e, storing the obtained attribute parameters, when the stored service ID is different from the service ID in the obtained attribute parameters.

After the logical channel number data corresponding to the current frequency point is parsed, and each of the attribute parameters included in the logical channel number data is obtained, each of the attribute parameters is stored in association. A channel list could be obtained according to the attribute parameters stored in association corresponding to each frequency point, so that the operation of program searching is not required afterwards. Preferably, after obtaining each of the attribute parameters in the logical channel number data corresponding to the first frequency point in the frequency band for the first time, each of the attribute parameters in the logical channel number data corresponding to the first frequency point in the frequency band for the first time is stored in association. Then, after extracting the logical channel number data corresponding to the second frequency point in the frequency band, and parsing each of the attribute parameters included in the logical channel number data corresponding to the second frequency point, according to the prestored logical channel number configuration table corresponding to the obtained operator, it's to compare whether the obtained service ID is consistent with the stored service ID. If the obtained service ID is inconsistent with the stored service ID, the logical channel number data corresponding to the two frequency points corresponds to two channels. In this case, each of the attribute parameters obtained by parsing is stored in association, which is included in the logical channel number data corresponding to the second frequency point. If the obtained service ID is consistent with the stored service ID, the logical channel number data corresponding to the two frequency points corresponds to a same channel. In this case, then it's to compare the obtained priority with the stored priority, when the obtained priority is higher than the stored priority, each of the attribute parameters stored in association is updated with each of the attribute parameters obtained. When the obtained priority is lower than the stored priority, each of the attribute parameters obtained is not to be stored in association. According to this way, every time after obtaining the logical channel number data corresponding to the current frequency point, the logical channel number data corresponding to the current frequency point is parsed, according to the prestored logical channel number configuration table corresponding to the operator, and each of the attribute parameters included in the logical channel number data is obtained. When the stored service ID is consistent with the obtained service ID, and the priority stored in association with the service ID is lower than the obtained priority, each of the attribute parameters stored in association is updated with each of the attribute parameters obtained. Until the logical channel number data corresponding to each frequency point in the frequency band of the operator is parsed, to obtain the channel list corresponding to the operator.

In the technical solution according to this embodiment, when searching programs, the logical channel number data could be parsed based on the prestored logical channel number configuration table corresponding to the operator, simplifying the parsing operation of the logical channel number, thereby improving the efficiency of program searching.

Figure 3:
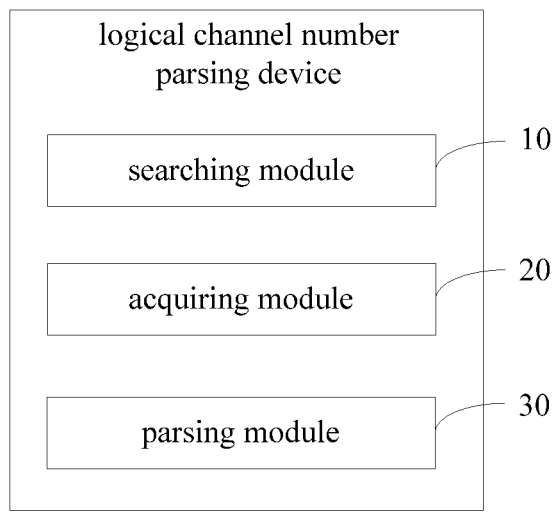
FIG. 3 is a functional module diagram of a first embodiment of a logical channel number parsing device according to this disclosure.

The present disclosure further provides a logical channel number parsing device. Referring to FIG. 3, FIG. 3 is a functional module diagram of a first embodiment of a logical channel number parsing device according to this disclosure.

In this embodiment, the logical channel number parsing device includes:

a searching module 10, configured to acquire an operator which provides program signal, and searching channels in sequence according to preset frequency points;

It's well known that, in different countries and regions, operators that provide program signal contents for terminals, such as digital televisions, digital television set-top boxes, are different, some regions even have a plurality of operators. The program signal contents provided by different operators are different. The difference in the program signal contents provided by operators means that channels are different and/or attribute parameters are different, for example, the channels corresponding to a same frequency point are different. In this embodiment, a logical channel number parsing device is provided inside the terminal, such as a digital television or a digital television set-top box, or a logical channel number parsing device is externally connected to the terminal, such as a digital television or a digital television set-top box. The terminal includes, but is not limited to, the digital television, the digital television set-top box, and so on.

When the terminal searches programs, the searching module 10 of the logical channel number parsing device first acquires the operator providing the program signal. Specifically, the operator providing the program signal for the terminal could be determined according to the operator selected by the user; or the operator providing the program signal for the terminal could be automatically acquired according to the country or the region corresponding to the current program searching. Or the operator is sent to the logical channel number parsing device after the operator is determined by the terminal, the searching module 10 acquires the operator information sent by the terminal. Those skilled in the art should understand that, the way to acquire the information of the operator is not to be limited herein. For example, first the user selects a corresponding country, after the country selected by the user is received, the searching module 10 acquires an operator list corresponding to the country, the operator list including each of operators in the selected country. Based on the operator list, the user could select a corresponding operator, and the logical channel number parsing device acquires the operator selected by the user.

an acquiring module 20, configured to acquire channel information of a current frequency point, and extracting logical channel number data from the channel information, when searching channels according to each of the frequency points;

an parsing module 30, configured to parse the logical channel number data according to a prestored logical channel number configuration table corresponding to the operator, to obtain each of attribute parameters included in the logical channel number data.

when the user searches programs, for example, clicks a program search control preset in the terminal, it is regarded that the terminal receives a program searching instruction. After the program searching instruction is received, the terminal searches channels. Specifically, the terminal could search channels, according to each frequency point in the corresponding frequency band, to search programs. For example, to lock one frequency point in the frequency band, programs are searched based on the frequency point which is currently locked, according to corresponding searching parameters set by the user.

When the program signal is searched, the acquiring module 20 obtains channel information corresponding to the current frequency point. The channel information includes logical channel number data, the logical channel number data includes each of attribute parameters, such as service ID, logical channel number, visible, only changed by numerical, priority, and so on. Since each operator possesses its own logical channel number regulation, for different operators, corresponding logical channel number regulations are different. For example, the attribute parameters included in the logical channel number data are different, and first bit offset and total bits corresponding to each of the attribute parameter are different. Specifically, when the program signal is searched, the acquiring module 20 receives the channel information corresponding to the current frequency point, such as Network Information Table (NIT), Service Description Table (SDT), which is sent by a server, then, extracts the logical channel number data corresponding to the current frequency point from the received NIT table and SDT table. It should be noted that, because the logical channel number data is generally included in the NIT table and the SDT table, it is needed to receive the NIT table and the SDT table of the locked frequency point.

Further, in this embodiment, the logical channel number parsing device further includes:

a configuration module, configured to customize corresponding logical channel number configuration tables for different operators, according to different logical channel number regulations of each operator in each country or region, and storing the logical channel number configuration tables in a database.

In this embodiment, the configuration module prestores the logical channel number configuration table corresponding to each of the operators. According to different logical channel number regulations corresponding to each operator in each country or region, the corresponding logical channel number configuration tables are customized for different operators, and the logical channel number configuration tables corresponding to different operators are stored in a database. The logical channel number configuration table corresponding to each operator includes each of the attribute parameters in the logical channel number data, the first bit offset and the total bits corresponding to each of the attribute parameters, the logical channel number data total bits, and so on.

When the acquiring module 20 extracts the logical channel number data corresponding to the current frequency point, the parsing module 30 parses the logical channel number data corresponding to the current frequency point, according to the prestored logical channel number configuration table corresponding to the operator providing the program signal currently, and each of the attribute parameters included in the logical channel number data is obtained.

In the technical solution according to this embodiment, after the searching module 10 acquires the operator providing the program signal, the acquiring module 20 acquires the logical channel number data, the parsing module 30 parses the logical channel number data based on the prestored logical channel number configuration table corresponding to the operator. There is no need to adopt different parsing algorithms for matching different operators, thus simplifying the parsing operation of the logical channel number.

Figure 4:
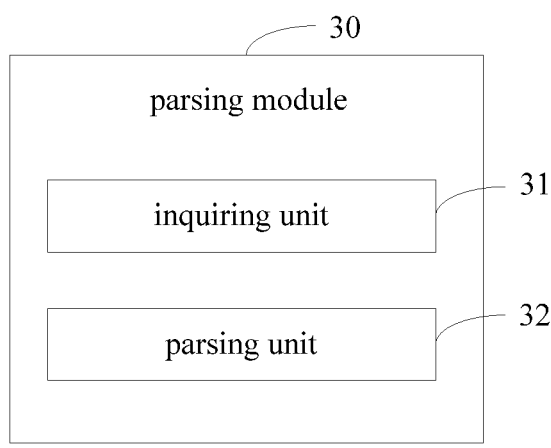
FIG. 4 is a detailed functional module diagram of a parsing module in a second embodiment of a logical channel number parsing device according to this disclosure.

Further, as shown in FIG. 4, a second embodiment of the logical channel number parsing device according to the present disclosure is provided based on the first embodiment. In this embodiment, the parsing module 30 includes:

an inquiring unit 30, configured to inquire whether there is the logical channel number configuration table in the database matching to the operator, when the logical channel number data is extracted;

a parsing unit 32, configured to parse the logical channel number data, according to the logical channel number configuration table matching to the operator, to obtain each of the attribute parameters included in the logical channel number data, when there is the logical channel number configuration table in the database matching to the operator.

In this embodiment, when the acquiring module 30 acquires the logical channel number data corresponding to the current frequency point, the inquiring unit 31 first inquires whether there is the logical channel number configuration table matching to the currently acquired operator, in the prestored logical channel number configuration tables matching to each operator. Those skilled in the art could understand that, whether there is the logical channel number configuration table matching to the currently acquired operator could also be inquired after the operator is acquired. When there is not the logical channel number configuration table matching to the currently acquired operator, the parsing unit 32 is unable to parse the logical channel number data according to the configuration table, so as to obtain each of the attribute parameters included in the logical channel number data. In this case, by sending request via the network, the logical channel number configuration table or the logical channel number regulation of the operator could be downloaded from a cloud server of the operator or the television manufacturer, for parsing the logical channel number. When there is the logical channel number configuration table matching to the operator, the parsing unit 32 parses the logical channel number data corresponding to the current frequency point, according to the queried logical channel number configuration table matching to the currently acquired operator, and each of the attribute parameters included in the logical channel number data is obtained. Specifically, the parsing unit 32 includes:

an acquiring sub-unit, configured to acquire first bit offset and total bits corresponding to each of the attribute parameters included in the logical channel number configuration table corresponding to the operator first bit offset;

a parsing sub-unit, configured to parse the logical channel number data according to the acquired first bit offset and the total bits corresponding to each of the attribute parameters, and determining each of the attribute parameters in the logical channel number data; based on different operators, the first bit offset and the total bits, corresponding to each of the attribute parameters in the logical channel number, are different first bit offset first bit offset.

For different operators, the first bit offset and the total bits of each attribute parameter in the logical channel number are different. In this embodiment, the first bit offset and the total bits corresponding to each attribute parameter in the logical channel number configuration table corresponding to the operator are obtained, when the logical channel number configuration table corresponding to the currently acquired operator is queried. For example, it's to obtain service ID first bit offset and service ID total bits corresponding to the service ID, logical channel number first bit offset and logical channel number total bits corresponding to the logical channel number, visible first bit offset and visible total bits corresponding to the visible, only changed by numerical first bit offset and only changed by numerical total bits corresponding to the only changed by numerical, priority first bit offset and priority total bits corresponding to the priority, and so on. Then, it's to parse the logical channel number data corresponding to the current frequency point, according to the obtained first bit offset and total bits corresponding to each of the attribute parameters, and determine each of the attribute parameters in the logical channel number data corresponding to the current frequency point. For example, if the obtained logical channel number first bit offset corresponding to the logical channel number is "**" bits, and the logical channel number total bits is 4 bits, the logical channel number is the attribute parameter, which corresponds to the 4 bits starting from the "**"th bit in the logical channel number data corresponding to the current frequency point.

Further, in this embodiment, the logical channel number parsing device further includes:

a storage module, configured to update the attribute parameters associated with a stored service ID with the obtained attribute parameters, when the stored service ID is consistent with the service ID in the obtained attribute parameters, and the priority associated with the stored service ID is lower than the priority in the obtained attribute parameters; each of the attribute parameters obtained is stored in association, when the frequency point of a current frequency-locked operation is the frequency point of the first frequency-locked operation; and store the obtained attribute parameters, when the stored service ID is different from the service ID in the obtained attribute parameters.

After the parsing module 30 parses the logical channel number data corresponding to the current frequency point, and obtains each of the attribute parameters included in the logical channel number data, the storage module stores each of the attribute parameters in association. A channel list could be obtained according to the attribute parameters stored in association corresponding to each frequency point, so that the operation of program searching is not required afterwards. Preferably, after obtaining each of the attribute parameters in the logical channel number data corresponding to the first frequency point in the frequency band for the first time, the storage module stores each of the attribute parameters in association, which is in the logical channel number data corresponding to the first frequency point in the frequency band for the first time. Then, after the logical channel number data corresponding to the second frequency point in the frequency band is extracted, and the parsing module 30 parses each of the attribute parameters included in the logical channel number data corresponding to the second frequency point, according to the prestored logical channel number configuration table corresponding to the obtained operator, the storage module compares whether the obtained service ID is consistent with the stored service ID. If the obtained service ID is inconsistent with the stored service ID, the logical channel number data corresponding to the two frequency points corresponds to two channels. In this case, the storage module stores each of the attribute parameters in association, which is obtained by parsing and included in the logical channel number data corresponding to the second frequency point. If the obtained service ID is consistent with the stored service ID, the logical channel number data corresponding to the two frequency points corresponds to a same channel. In this case, then it's to compare the obtained priority with the stored priority, when the obtained priority is higher than the stored priority, the storage module updates each of the attribute parameters stored in association with each of the attribute parameters obtained. When the obtained priority is lower than the stored priority, each of the attribute parameters obtained is not to be stored in association. According to this way, every time after obtaining the logical channel number data corresponding to the current frequency point, the parsing module 30 parses the logical channel number data corresponding to the current frequency point, according to the prestored logical channel number configuration table corresponding to the operator, and obtains each of the attribute parameters included in the logical channel number data. When the stored service ID is consistent with the obtained service ID, and the priority stored in association with the service ID is lower than the obtained priority, the storage module updates each of the attribute parameters stored in association with each of the attribute parameters obtained. Until the logical channel number data corresponding to each frequency point in the frequency band of the operator is parsed, to obtain the channel list corresponding to the operator.

In the technical solution according to this embodiment, when searching programs, the parsing module 30 parses the logical channel number data based on the prestored logical channel number configuration table corresponding to the operator, simplifying the parsing operation of the logical channel number, thereby improving the efficiency of program searching.

The foregoing description merely portrays some illustrative embodiments in accordance with the disclosure and therefore is not intended to limit the patentable scope of the disclosure. Any equivalent structure or flow transformations that are made taking advantage of the specification and accompanying drawings of the disclosure and any direct or indirect applications thereof in other related technical fields shall all fall in the scope of protection of the disclosure.

What is claimed is:

1. A logical channel number parsing method, wherein, the logical channel number parsing method comprises:
   acquiring an operator which provides program signal, and searching channels in sequence according to preset frequency points;
   acquiring channel information of a current frequency point, and extracting logical channel number data from the channel information, when searching channels according to each of the frequency points;
   acquiring a first bit offset and total bits corresponding to each of attribute parameters comprised in a prestored logical channel number configuration table corresponding to the operator; and parsing the logical channel number data according to the acquired first bit offset and the total bits corresponding to each of the attribute parameters, and determining each of the attribute parameters in the logical channel number data; wherein, based on different operators, the first bit offset and the total bits, corresponding to each of the attribute parameters in the logical channel number, are different.

2. The logical channel number parsing method of claim 1, wherein, prior to the operation of acquiring an operator which provides program signal, the method further comprises:
   customizing corresponding logical channel number configuration tables for different operators, according to different logical channel number regulations of each operator in each country or region, and storing the logical channel number configuration tables in a database.

3. The logical channel number parsing method of claim 2, wherein, the operation of parsing the logical channel number data according to a prestored logical channel number configuration table corresponding to the operator, to obtain each of attribute parameters comprised in the logical channel number data, comprises:
   inquiring whether there is the logical channel number configuration table in the database matching to the operator, when the logical channel number data is extracted; and
   parsing the logical channel number data, according to the logical channel number configuration table matching to the operator, to obtain each of the attribute parameters comprised in the logical channel number data, when there is the logical channel number configuration table in the database matching to the operator.

4. The logical channel number parsing method of claim 1, wherein, the attribute parameters comprise service ID and priority, after the operation of obtaining each of attribute parameters comprised in the logical channel number data, the method further comprises:
   updating the attribute parameters associated with a stored service ID with the obtained attribute parameters, when the stored service ID is consistent with the service ID in the obtained attribute parameters, and the priority associated with the stored service ID is lower than the priority in the obtained attribute parameters; wherein, each of the attribute parameters obtained is stored in association with the frequency point of a current frequency-locked operation, when the frequency point of the current frequency-locked operation is the frequency point of a first frequency-locked operation; and
   storing the obtained attribute parameters, when the stored service ID is different from the service ID in the obtained attribute parameters.

5. The logical channel number parsing method of claim 2, wherein, the attribute parameters comprise service ID and priority, after the operation of determining each of attribute parameters comprised in the logical channel number data, the method further comprises:
   updating the attribute parameters associated with a stored service ID with the obtained attribute parameters, when the stored service ID is consistent with the service ID in the obtained attribute parameters, and the priority associated with the stored service ID is lower than the priority in the obtained attribute parameters; wherein, each of the attribute parameters obtained is stored in association with the frequency point of a current frequency-locked operation, when the frequency point of the current frequency-locked operation is the frequency point of a first frequency-locked operation; and storing the obtained attribute parameters, when the stored service ID is different from the service ID in the obtained attribute parameters.

6. The logical channel number parsing method of claim 3, wherein, the attribute parameters comprise service ID and priority, after the operation of determining each of the attribute parameters in the logical channel number data, the method further comprises:

updating the attribute parameters associated with a stored service ID with the obtained attribute parameters, when the stored service ID is consistent with the service ID in the obtained attribute parameters, and the priority associated with the stored service ID is lower than the priority in the obtained attribute parameters; wherein, each of the attribute parameters obtained is stored in association with the frequency point of a current frequency-locked operation, when the frequency point of the current frequency-locked operation is the frequency point of a first frequency-locked operation; and storing the obtained attribute parameters, when the stored service ID is different from the service ID in the obtained attribute parameters.

7. A logical channel number parsing device, wherein, the logical channel number parsing device comprises at least one processor and a memory storing program instructions, wherein the program instructions are executable by the at least one processor to perform:

acquiring an operator which provides program signal, and searching channels in sequence according to preset frequency points;

acquiring channel information of a current frequency point, and extracting logical channel number data from the channel information, when searching channels according to each of the frequency points; and acquiring a first bit offset and total bits corresponding to each of attribute parameters comprised in a prestored logical channel number configuration table corresponding to the operator; and parsing the logical channel number data according to the acquired first bit offset and the total bits corresponding to each of the attribute parameters, and determining each of the attribute parameters in the logical channel number data; wherein, based on different operators, the first bit offset and the total bits, corresponding to each of the attribute parameters in the logical channel number, are different.

8. The logical channel number parsing device of claim 7, wherein, the program instructions are executable by the at least one processor to further perform:

customizing corresponding logical channel number configuration tables for different operators, according to different logical channel number regulations of each operator in each country or region, and storing the logical channel number configuration tables in a database.

9. The logical channel number parsing device of claim 8, wherein, the program instructions are executable by the at least one processor to further perform:

inquiring whether there is the logical channel number configuration table in the database matching to the operator, when the logical channel number data is extracted; and parsing the logical channel number data, according to the logical channel number configuration table matching to the operator, to obtain each of the attribute parameters comprised in the logical channel number data, when there is the logical channel number configuration table in the database matching to the operator.

10. The logical channel number parsing device of claim 7, wherein, the attribute parameters comprise service ID and priority, the program instructions are executable by the at least one processor to further perform:

updating the attribute parameters associated with a stored service ID with the obtained attribute parameters, when the stored service ID is consistent with the service ID in the obtained attribute parameters, and the priority associated with the stored service ID is lower than the priority in the obtained attribute parameters; wherein, each of the attribute parameters obtained is stored in association with the frequency point of a current frequency-locked operation, when the frequency point of the current frequency-locked operation is the frequency point of a first frequency-locked operation; and store the obtained attribute parameters, when the stored service ID is different from the service ID in the obtained attribute parameters.

11. The logical channel number parsing device of claim 8, wherein, the attribute parameters comprise service ID and priority, the program instructions are executable by the at least one processor to further perform:

updating the attribute parameters associated with a stored service ID with the obtained attribute parameters, when the stored service ID is consistent with the service ID in the obtained attribute parameters, and the priority associated with the stored service ID is lower than the priority in the obtained attribute parameters; wherein, each of the attribute parameters obtained is stored in association with the frequency point of a current frequency-locked operation, when the frequency point of the current frequency-locked operation is the frequency point of a first frequency-locked operation; and store the obtained attribute parameters, when the stored service ID is different from the service ID in the obtained attribute parameters.

12. The logical channel number parsing device of claim 9, wherein, the attribute parameters comprise service ID and priority, the program instructions are executable by the at least one processor to further perform:

updating the attribute parameters associated with a stored service ID with the obtained attribute parameters, when the stored service ID is consistent with the service ID in the obtained attribute parameters, and the priority associated with the stored service ID is lower than the priority in the obtained attribute parameters; wherein, each of the attribute parameters obtained is stored in association with the frequency point of a current frequency-locked operation, when the frequency point of the current frequency-locked operation is the frequency point of a first frequency-locked operation; and store the obtained attribute parameters, when the stored service ID is different from the service ID in the obtained attribute parameters.

* * * * *